(12) United States Patent
Bruscoe (10) Patent No.: US 9,679,275 B2
(45) Date of Patent: Jun. 13, 2017

(54) CASE FOR COMPUTER

(71) Applicant: RevUp Render, Inc., Arlington, VA (US)

(72) Inventor: Ry Bruscoe, Arlington, VA (US)

(73) Assignee: RevUp Render, Inc., Arlington, VA (US)

( * ) Notice: Subject to any disclaimer, the term of this patent is extended or adjusted under 35 U.S.C. 154(b) by 0 days.

(21) Appl. No.: 14/656,679

(22) Filed: Mar. 12, 2015

(65) Prior Publication Data

US 2015/0261269 A1    Sep. 17, 2015

Related U.S. Application Data

(60) Provisional application No. 61/952,115, filed on Mar. 12, 2014.

(51) Int. Cl.
*G06F 1/20* (2006.01)
*G06Q 20/06* (2012.01)

(52) U.S. Cl.
CPC ............ *G06Q 20/065* (2013.01); *G06F 1/20* (2013.01)

(58) Field of Classification Search
CPC ...................... H05K 7/20172; H05K 7/20145
USPC ............... 361/679.48, 679.49, 690, 697, 700
See application file for complete search history.

(56) References Cited

U.S. PATENT DOCUMENTS

| | | | |
|---|---|---|---|
| 6,352,103 B1 * | 3/2002 | Chu ................... | F28D 15/0233 165/104.33 |
| 7,643,292 B1 * | 1/2010 | Chen ........................ | G06F 1/20 361/694 |
| 2012/0320524 A1 | 12/2012 | El-Essawy et al. | |
| 2014/0361671 A1 | 12/2014 | Degner et al. | |
| 2014/0361672 A1 | 12/2014 | Whang et al. | |
| 2014/0361893 A1 | 12/2014 | Degner et al. | |
| 2014/0362519 A1 | 12/2014 | Degner et al. | |
| 2014/0362522 A1 | 12/2014 | Degner et al. | |
| 2014/0362523 A1 | 12/2014 | Degner et al. | |
| 2014/0362576 A1 | 12/2014 | Degner et al. | |

OTHER PUBLICATIONS

Simple Machines Forum, "[Klondike] Case Design Thread for K16", "Bitcoin Forum (https://bitcointalk.org/index.php?topic=223680.0;all", First Post Published Jun. 2, 2013, Publisher: Simple Machines Forum, Published in: US.
Softpedia, "Why the New Mac Pro Looks Like a Garbage Can", "The New Mac Pro's Cooling System—Why the New Mac Pro Looks Like a Garbage Can", Feb. 7, 2014, Publisher: http://news.softpedia.com/newsImage/Why-the-New-Mac-Pro-Looks-Like-Garbage-Can-2.png/, Published in: US.

* cited by examiner

*Primary Examiner* — Tuan T Dinh
*Assistant Examiner* — Mukund G Patel
(74) *Attorney, Agent, or Firm* — Loginov & Associates; William A. Loginov (57) ABSTRACT

A computing device with efficient cooling is provided. The computing device includes a housing with a plurality of components disposed therein. The components can include a pair of fan assemblies, a funnel assembly, and a heat sink assembly. The funnel assembly can direct the air drawn into the housing through a longitudinal channel define in the heat sink assembly and can direct the air across an exterior portion of the heat sink assembly, allowing for efficient cooling of the processors affixed to an exterior of the heat sink assembly.

11 Claims, 8 Drawing Sheets

CASE FOR COMPUTER

RELATED APPLICATIONS

This application claims the benefit of U.S. Provisional Application No. 61/952,115, filed Mar. 12, 2014, entitled CASE FOR COMPUTER, the entire disclosure of which is herein incorporated by reference.

FIELD OF THE INVENTION

The present disclosure relates to an assembly for dissipating heat in a computer device.

BACKGROUND OF THE INVENTION

Mining cryptocurrency has become a way for those with computing devices to harness the computing power of the device in order to earn crytpocurrencies, such as Bitcoin. A gauge of mining capacity is in the units of hash, such as GH/s. In order to increase the mining capacity, additional and/or more powerful processing modules can be assembled in order to increase the amount of cryptocurrency mined over a period of time. However, a limitation on such additional or more powerful processing modules can be heat dissipation, e.g., the addition of too many modules can result in overheating of the device.

SUMMARY OF THE INVENTION

The present disclosure overcomes the prior art by providing a computing device with an efficient heat dissipation assembly. One aspect of the disclosure provides computing device, comprising: a housing; a rail assembly disposed in an interior of the housing, the rail assembly extending a length of the housing; a first fan assembly mounted on the rail assembly and configured to draw air into the interior of the housing; a heat sink assembly mounted on the rail assembly, the heat sink assembly having a plurality of external faces for receiving one or more processors and defining an interior longitudinal channel; a funnel assembly mounted on the rail assembly and configured to direct an air flow across the plurality of faces of the heat sink and through the interior longitudinal channel; a second fan assembly mounted on the rail assembly and configured to force air out of the housing.

In one example, the housing is configured to be stored in a 4U rack assembly.

In one example, the heat sink assembly comprises a plurality of heat sinks engaged with one another.

In one example, the funnel assembly defines a first opening and a second opening, the first opening being proximal to the first fan assembly and the second opening being distal to the first fan assembly.

In one example, the first opening defines a first area that is less than an area of the second opening.

In one example, the funnel assembly comprises a plurality of tapered sidewalls.

In one example, the tapered sidewalls are tapered at an angle between 70 degrees and 85 degrees.

In one example, the funnel assembly is disposed between the first fan assembly and the heat sink assembly.

In one example, the rail assembly comprises a plurality of rails.

In one example, the one or more processors are affixed to the plurality of faces of the heat sink assembly.

In one example, the one or more processors comprises one or more ASICs configured to mine a cryptocurrency.

BRIEF DESCRIPTION OF THE DRAWINGS

The invention description below refers to the accompanying drawings, of which.

DETAILED DESCRIPTION

Figure 1A:
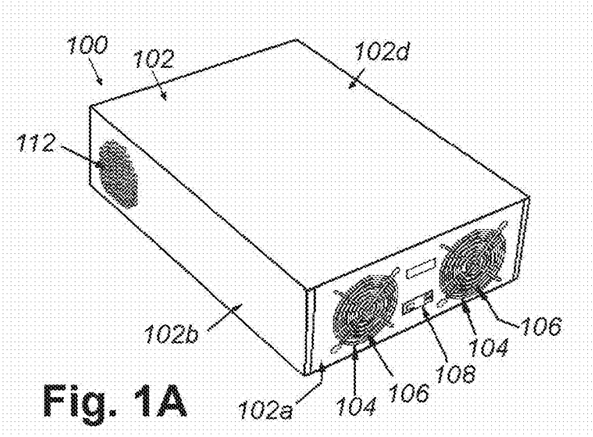
FIGS. 1A-B are front and rear perspective view of a computing device according to one or more aspects of the disclosure.
Figure 1B:
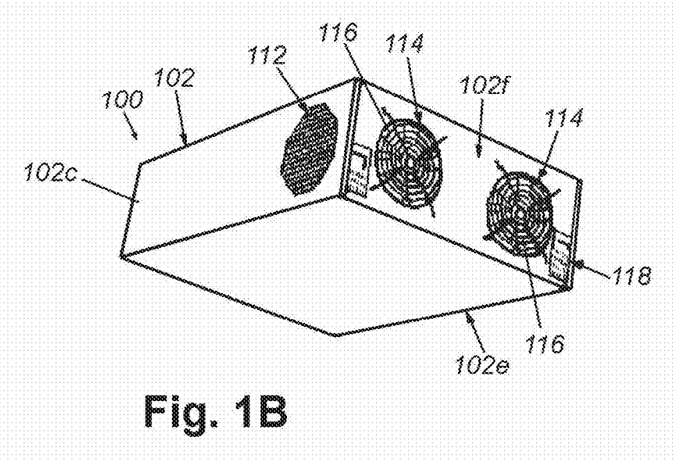

FIGS. 1A-B are front and rear perspective view of a computing device 100 according to one or more aspects of the disclosure. As shown, the computing device 100 can include a housing 102. The housing 102 can be any shape, and in one example can be a rectangular parallelepiped. The housing 102 can be sized and shaped to be fit into any server rack environment, such as 4U. In other examples, can be a stand alone device that can operate separately from a server rack environment. The housing 102 can be formed of any material, and in one example can be formed of sheet metal, e.g. aluminum.

The housing 102 can have a plurality of faces 102a-f. The front face 102a can define a pair of openings 104. The openings 104 can be any shape, and in the example are depicted as being circular. In this regard, the openings 104 can have a dimension, such as a diameter, to accommodate a fan assembly, as will be described in greater detail below. A pair of guards 106 can be attached to the front face 102a. The guards 106 can include a plurality of concentric metallic rings such that air can freely flow into and out of the openings 104, but that objects larger than the relative spacing between the metallic rings are prevented from entering into the housing 102.

The front face 102a can also include a plurality of ports 108 for connection to the internal components of the device 100. The ports can be any type of port that allows for transfer of power and/or data, such as USB, Ethernet, etc. The front face 102a can also include a display 110. The display 110 can display the status of the computing device 100 and can alert a user of any changes in status. The display 110 can be any type of display, such as an LCD display. The display 110 can be operatively connected to an internal processor arranged within the housing 102, such as a Raspberry Pi module.

The rear face 102f can define a pair of openings 114. The openings 114 can be any shape, and in the example are depicted as being circular. In this regard, the openings can have a dimension, such as a diameter, to accommodate a fan assembly, as will be described in greater detail below. A pair of guards 116 can be attached to the rear face 102a. The guards 116 can include a plurality of concentric metallic rings such that air can freely flow into and out of the openings 114, but that objects larger than the relative spacing between the metallic rings are prevented from entering into the housing 102. In one example, the openings and guards of the rear face are identical to the openings and grate coverings arranged on the front face.

The rear face can also include ports 118 for connection to the internal components of the device 100, such as internal power circuitry. The ports can be any type of port that allows for transfer of power and/or data, such as a female port for receiving a power cable configured to connect to a conventional wall outlet or a power source of a server rack architecture.

The lateral faces 102b-c can be planar surfaces and can be parallel to one another. The lateral faces 102b-c can each define a vent region 112. The vent region 112 can include a plurality of holes formed in each of the lateral faces 102b-c to allow airflow between the interior and exterior of the housing 102. The upper and lower faces 102d-e can be planar surfaces and can be parallel to one another.

In other examples, the housing can include additional connection features or structure to enable the housing 102 to be secure in a rack architecture, such as rails, screw holes, etc.

Figure 2:
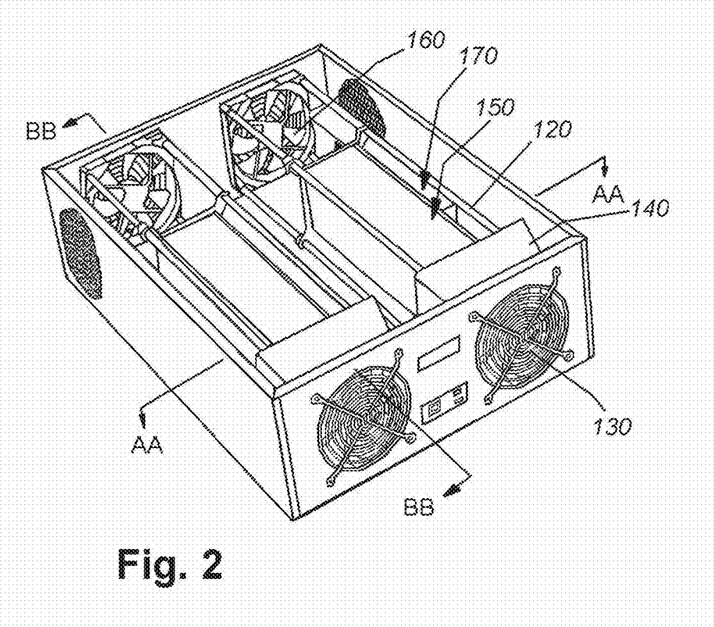
FIG. 2 is a view of the computing device with an upper face of the housing removed to enable a view of the components disposed within the housing according to one or more aspects of the disclosure.

FIG. 2 is a view of the computing device 100 with an upper face 102d of the housing 102 removed to enable a view of the components disposed within the housing 102 according to one or more aspects of the disclosure.

As a general overview, the device 100 can include a rail assembly 120, a first fan assembly 130, a funnel assembly 140, a heat sink assembly 150, a second fan assembly 160, and power circuitry 170. Each of these components/assemblies will be discussed in greater detail below. While FIG. 2 depicts a pair of each of the assemblies 130-170, it is contemplated that one or more assemblies can be included within the housing. In the example, where only a single of each assembly is included, the housing can have a width of approximately one half the depicted width.

The rail assembly 120 can include a plurality of rails 120a-h that each extends an entire length of the housing 102. The respective ends of the plurality of rails 120a-h can abut an interior portion of the housing 102 such that a screw inserted into the front and rear faces to secure the grate coverings engages with the respective ends of the plurality of rails 120a-h. Each of the rails 120a-h can be a unitary rail or can be a combination of shorter rails that, when combined, extend an entire length of the housing 102. Each of the rails can have any shape, and in one example have a circular cross section that defines a diameter. The diameter of the rails can be uniform over an entire length of the housing. In one example, where a combination of smaller rails combines to form a larger rail extending the length of the housing, one or more junctions can exist on the rails. The junction portions can have a diameter greater than the diameter of the remainder of the rail. In one example, any of the components mounted on the rail assembly can be slid or readjusted in the axial direction of the rails 120a-h. This can allow the components to be moved along the rails and repositioned within the housing. Once repositioned, the components can be secured into place using a metal collar.

A first fan assembly 130 can include a pair of fans 130a-b that can each be disposed adjacent to the openings 104. Each of the fans 130a-b can be formed of plastic, metal, or a combination of the two. The fans can have a plurality of blades and can rotate in any direction. In one example, the blades rotate counterclockwise to draw air into an interior of the housing 102 from an exterior of the housing 102 by way of the openings 104. The fans can rotate at any speed, and in one example rotate at up to 2000 rpm to draw air into the housing 102. The fan can rotate at a constant rpm, or in other examples can vary in rotational speed. The first fan assembly 130 can include connection structures to connect to the rails 120.

A funnel assembly 140 can be disposed adjacent to the first fan assembly 130. The funnel assembly 140 can include connection features that can allow mounting on the rails 120. The funnel assembly 140 can define a first opening 142 and a second opening 144. The first opening 142 can be disposed proximate to the first fan assembly 130 and the second opening 144 can be disposed distal from the first fan assembly 130. The first and second openings 142 and 144 can generally define planes that can be parallel to one another. The first and second openings 142-144 can be any shape, and in one example can be substantially square, i.e., linear sides of a square that meet at rounded corners rather than perpendicularly intersecting corners. The length and/or width of the first opening 142 can be generally similar to the dimensions of the first fan assembly 130 such that as much of the air flow drawn from the fan assembly 130 is drawn through the funnel assembly 140.

The second opening 144 of the funnel 140 can have a length, width, and/or cross sectional area that is larger than the length, width, and/or cross sectional area of the first opening 142. In this regard, the sidewalls 146a-d of the funnel assembly 140 can be tapered to accommodate the differing dimensions of the first and second opening 142-144. For example, the taper can be angled. As shown, the taper of the sidewalls 146a-b can be between 70-85 degrees with respect to the longitudinal axis, and in one specific example can be approximately 79.13 degrees. The taper of sidewalls 146c-d can also be between 70-85 degrees, and in one specific example can be approximately 74.95 degrees.

Figure 5:
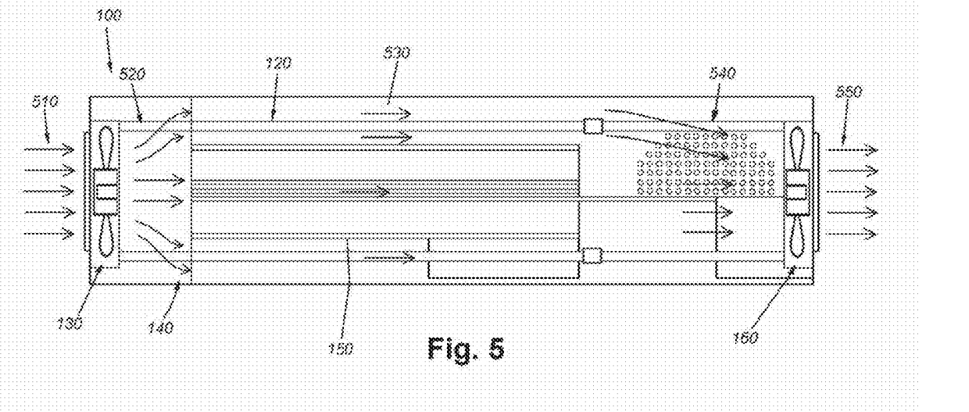
FIG. 5 is a cross sectional view of the computing device of FIG. 2 along the line BB-BB.
Figure 7:
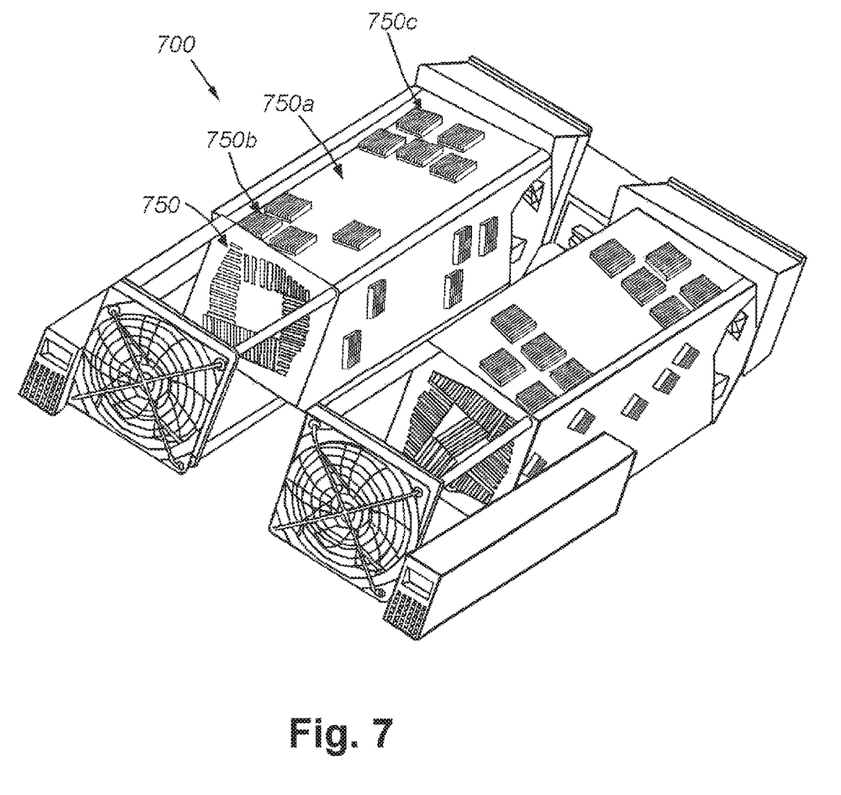
FIG. 7 is a perspective view of the components of a computing device according to another aspect of the disclosure.
Figure 8:
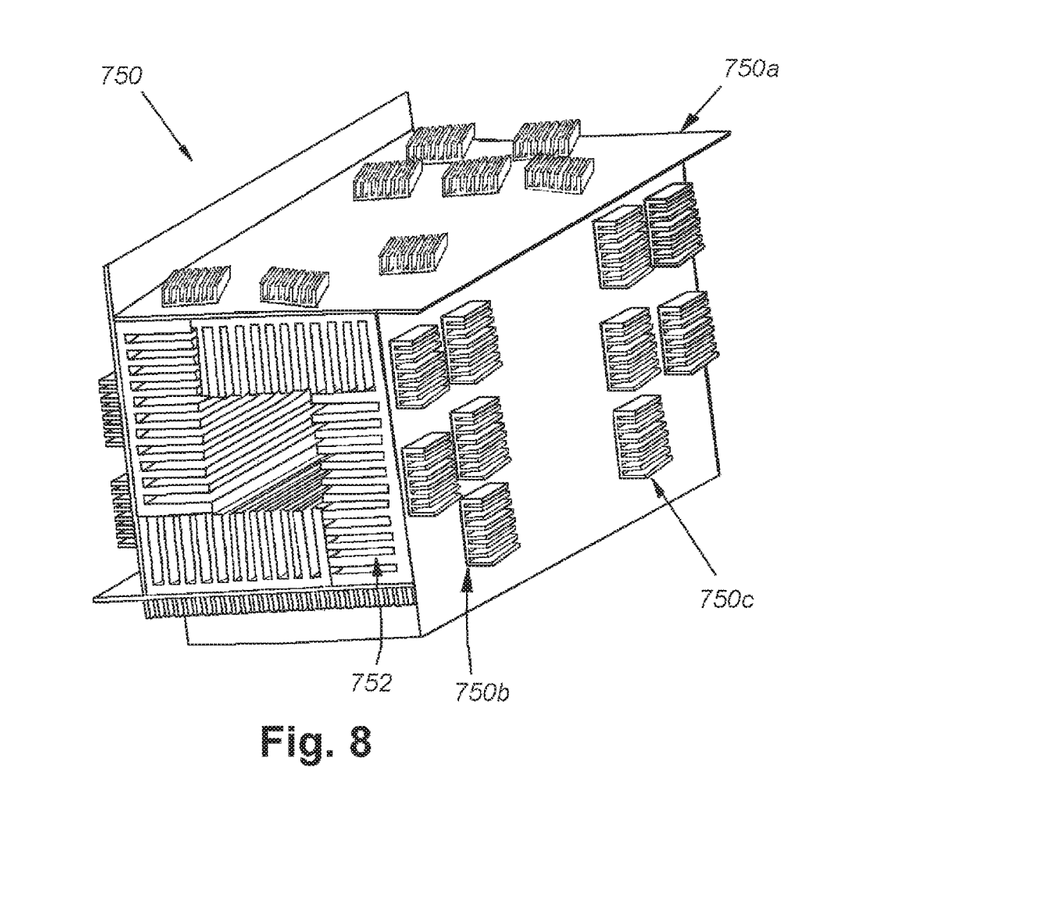
FIG. 8 is a perspective view of the heat sink assembly of FIG. 7.

The heat sink assembly 150 can include a plurality of individual heat sink elements engaged and interlocked to form a single heat sink assembly 150. The heat sink assembly 150 can be disposed adjacent to the funnel assembly 140, such that the heat sink assembly is flush with the second opening 144. The heat sink assembly 150 can include a pair of bracket elements 152 disposed at each end thereof to allow the heat sink assembly 150 to be mounted to the rails 120. The bracket elements 152 can abut the funnel assembly 130 such that the heat sink assembly is flush with the funnel assembly, as shown in FIG. 5. The heat sink assembly can include a plurality of external faces 150a-d. The faces 150a-d can include connection features, e.g., threaded openings or the like, to allow for fixation of a plurality printed circuit boards (PCBs) to be affixed thereto. The PCBs can include a plurality of processors disposed thereon or attached thereto, as shown in FIGS. 7 and 8. In one example, up to ten processors can be affixed to each face 150a-d, allowing for up to forty for each heat sink and up to eighty total in the computing device. As shown, the faces 150a-d can be generally co-planar with the respective faces of the housing 102a-f. In other examples, the faces 150a-d are not co-planar with the surfaces of the housing 102a-f, as shown in FIG. 7.

The processors can be any kind of processors capable of executing machine readable instructions. In one example, the processors can be configured to mine or extract one or more cryptocurrencies, such as Bitcoin, Litecoin, Dogecoin, or Coinye. In this regard, the processors can include one or more graphics processor units (GPU) or can comprise one or more application specific integrated circuits (ASIC) for mining or extracting the aforementioned cryptocurrencies. In one particular example, the ASIC can be a CoinCraft A1 28 nm ASIC. The CoinCraft A1 28 nm ASIC can have a hashing power of 20 GH/s in low power mode, 25 GH/s in nominal power mode, and up to 40 GH/s in turbo mode. In other examples, the processors can be configured or used to perform high performance computing (HPC), or other uses such as quantitative trading.

Figure 3:
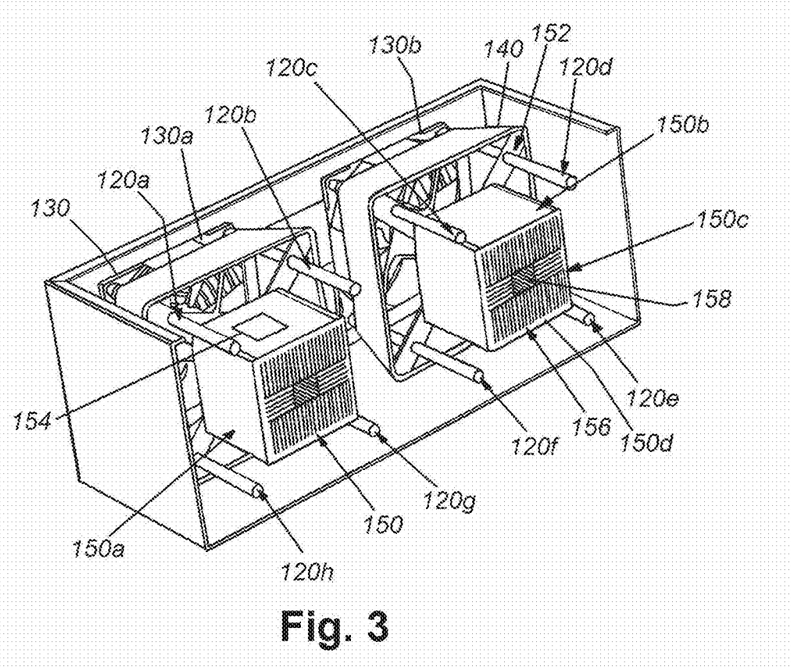
FIG. 3 is a cross sectional view of the computing device of FIG. 2 along the line AA-AA.
Figure 4A:
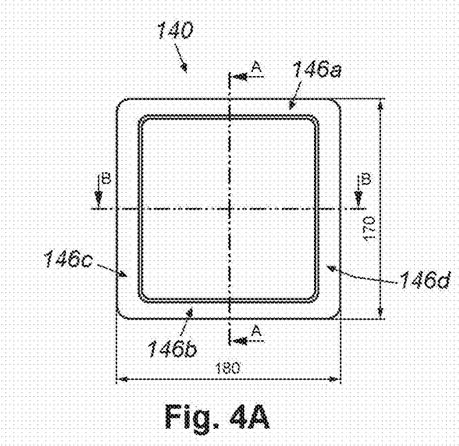
FIGS. 4A-D are a front view of a funnel assembly, a cross sectional view along line A-A of the funnel assembly, a cross sectional view along line B-B of the funnel assembly, and a front perspective view of the funnel assembly according to aspects of the disclosure.
Figure 4B:
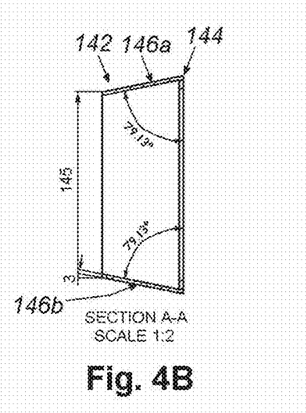
Figure 4C:
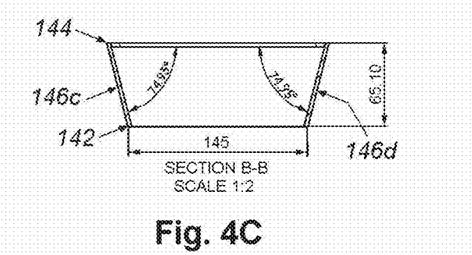
Figure 4D:
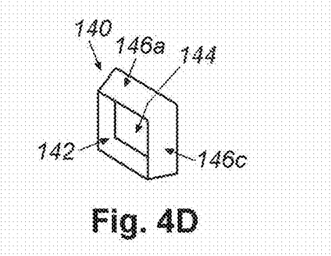

The heat sink assembly 150 can include a plurality of fins 156 formed in an interior of the assembly 150 and can define a longitudinal channel 158. The fins 156 can receive excess thermal energy from the processors and can dissipate the heat by way of the air flow through the longitudinal channel 158. The longitudinal channel can have any cross sectional shape, and in one example can have a square cross sectional shape, as shown in FIGS. 3 and 8. In other examples, the channel can have other polygonal cross sectional shapes, or can be circular, ovular, or any other shape.

In one example, the heat sink assembly 150 extends a portion of the length between the fan assemblies 130 and 160, while in other examples the length of the heat sink assembly 150 can extend an entire distance between the fan assemblies 130 and 160 to allow for more processors to be affixed thereto.

The second fan assembly 160 can include a pair of fans 160a-b that can each be disposed adjacent to the openings 114. Each of the fans 160a-b can be formed of plastic, metal, or a combination of the two. The fans can have a plurality of blades and can rotate in any direction. In one example, the blades rotate counterclockwise to force air coming from the first fan assembly to the exterior of the housing by way of openings 114. The fans can rotate at any speed, and in one example rotate at up to 2000 rpm to draw air into the housing 102. The fan can rotate at a constant rpm, or in other examples can vary in rotational speed. The first fan assembly 160 can include connection structures to connect to the rails 120. In one example, the second fan assembly can be configured identically to the first assembly, and in particular can rotate at the same rotational speed.

The arrangement of the first fan assembly, funnel assembly, heat sink assembly, and second fan assembly allow for efficient cooling of the processors configured on the heat sink. As shown in FIG. 5, the air flow 510 is drawn into the housing 102 by way of the first fan assembly and through the openings 104. The flow of air 520 inside the housing is drawn into the funnel assembly 140. Because of the tapered nature of the sidewalls of the funnel assembly, the flow of air 530 is directed through both the longitudinal channel of the heat sink assembly as well as across an exterior surface of the heat sink on which the processors are affixed. In this regard, the flow of air 530 going through the longitudinal channel and the fins of the heat sink as well as across the processors themselves, or across heat sinks disposed atop the processors, allows for efficient cooling of the processors. The flow of air 540 recombines upon exit from the longitudinal channel. The flow of air 550 is then drawn out of the rear of the housing via the second fan assembly. With the efficient cooling system, more powerful processors, such as ASICs, can be affixed to the heat sink without worry of overheating of the processors. More powerful processors can allow for an increased capacity to mine cryptocurrencies, and can achieve a hash rate of up to 1200 Gh/s.

The power circuitry 170 can include any type of electrical components that can convert or modulate a source of power in order to power the components of the computing device 100. The power circuitry 170 can include a connection portion that connects to an interior of the housing 102.

Figure 6:
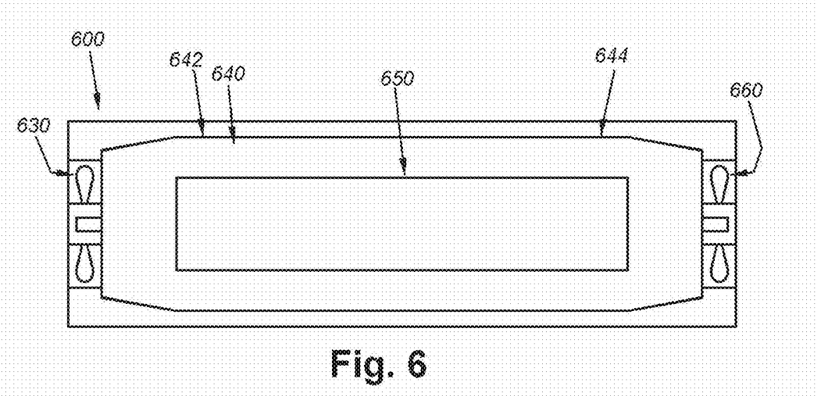
FIG. 6 is a cross sectional view of a computing device according to another aspect of the disclosure.

FIG. 6 depicts a computing device 600 whereby the funnel assembly 640 extends an entire length between fan assemblies 630 and 660. In this example, the computing device 600 is similar to the computing device 100 described above, except that the funnel assembly extends an entire length between fan assemblies 630 and 660 and includes two tapered regions 642 and 644. The tapered regions 642 and 644 can be identical to the tapered sidewalls described above. In this regard, the funnel assembly 640 forms an enclosure around the heat sink assembly 650 and allows for air to flow within a longitudinal channel of the heat sink assembly 650, as well as around an exterior surface of the heat sink assembly 650, as described above. While the heat sink assembly 650 is depicted as extending a portion of the length between the fan assemblies 630 and 660, in other examples the length of the heat sink assembly 650 can extend an entire distance between the fan assemblies 630 and 660 to allow for more processors to be affixed thereto.

FIG. 7 is a perspective view of the components of a computing device 700 according to another aspect of the disclosure. The computing device 700 includes the components of computing device 100 as set forth above. As shown and similar to as described above, the heat sink assembly 750 has a plurality of printed circuit boards 750a attached thereto. The printed circuit boards 750a include a plurality of processors 750b mounted thereto. Atop the processors 750b, a plurality of heat sinks 750c can be attached to the processors 750b, either permanently, temporarily, or semi-permanently. In this regard, the flow of air that is directed along the exterior faces of the heat sink assembly can dissipate heat generated from the processors 750b by way of the heat sinks 750c. In the example of FIG. 7, the faces of the heat sink assembly 750 are tilted with respect to the horizontal and vertical planes generally defined by the faces of the housing. In this regard, the tilt of the heat sink assemblies 750 allows for the PCBs 750a, which extend beyond the faces of the heat sink assembly 750, to fit securely within the housing of the device 700.

FIG. 8 is a perspective view of the heat sink assembly 750 of FIG. 7. As shown, the heat sink assembly 750 includes a plurality of individual heat sink elements 752 that engage with one another to form an overall heat sink assembly 750. A PCB 750a is mounted to each of the individual heat sink elements 752, such that interior portions of the PCB (e.g., portions directed toward the longitudinal channel) are free of fins. In this regard, the PCB has a width that is greater than a width dimension of the heat sink element 752. This allows space for engagement of the individual heat sink elements 752 with one another and provides a region of the PCB that extends beyond, or hangs over, adjacent PCBs. The increased width of the PCB allows for additional space for additional processors, thereby increasing the computing power of the device.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. Accordingly, this description is meant to be taken only by way of example, and not to otherwise limit the scope of this invention.

What is claimed is:

1. A computing device, comprising:
   a housing;
   a rail assembly disposed in an interior of the housing, the rail assembly extending a length of the housing;
   a first fan assembly mounted on the rail assembly and configured to draw air into the interior of the housing;
   a heat sink assembly mounted on the rail assembly, the heat sink assembly comprising a plurality of heat sinks engaged with one another such that the heat sink assembly comprises a plurality of planar external faces for receiving one or more processors and defining an interior longitudinal channel;
   a funnel assembly mounted on the rail assembly and configured to direct an air flow across the plurality of faces of the heat sink and through the interior longitudinal channel; and
   a second fan assembly mounted on the rail assembly and configured to force air out of the housing,
   wherein the funnel assembly defines a first opening and a second opening, the first opening being proximal to the first fan assembly and the second opening being distal to the first fan assembly.

2. The computing device of claim 1, wherein the housing is configured to be stored in a 4U rack assembly.

3. The computing device of claim 1, wherein the first opening defines a first area that is less than an area of the second opening.

4. The computing device of claim 1, wherein the funnel assembly comprises a plurality of tapered sidewalls.

5. The computing device of claim 4, wherein the tapered sidewalls are tapered at an angle between 70 degrees and 85 degrees.

6. The computing device of claim 1, wherein the funnel assembly is disposed between the first fan assembly and the heat sink assembly.

7. The computing device of claim 1, wherein the rail assembly comprises a plurality of rails.

8. The computing device of claim 1, wherein the one or more processors are affixed to the plurality of faces of the heat sink assembly.

9. The computing device of claim 8, wherein the one or more processors comprises one or more ASICs configured to mine a cryptocurrency.

10. A computing device, comprising:
    a housing;
    a rail assembly disposed in an interior of the housing, the rail assembly extending a length of the housing;
    a first fan assembly mounted on the rail assembly and configured to draw air into the interior of the housing;
    a heat sink assembly mounted on the rail assembly, the heat sink assembly comprising a plurality of heat sinks engaged with one another such that the heat sink assembly comprises four external planar faces and defines an interior longitudinal channel, each of the four external planar faces configured to receive one or more processors;
    a funnel assembly mounted on the rail assembly and configured to direct an air flow across the plurality of faces of the heat sink and through the interior longitudinal channel; and
    a second fan assembly mounted on the rail assembly and configured to force air out of the housing,
    wherein the funnel assembly defines a first opening and a second opening, the first opening being proximal to the first fan assembly and the second opening being distal to the first fan assembly.

11. A computing device, comprising:
    a housing;
    a rail assembly disposed in an interior of the housing, the rail assembly extending a length of the housing;
    a first fan assembly mounted on the rail assembly and configured to draw air into the interior of the housing;
    a heat sink assembly mounted on the rail assembly, the heat sink assembly comprising a plurality of heat sinks engaged with one another such that the heat sink assembly comprises four external planar faces and defines an interior longitudinal channel having a square cross sectional shape, each of the four external planar faces configured to receive one or more processors;
    a funnel assembly mounted on the rail assembly and configured to direct an air flow across the plurality of faces of the heat sink and through the interior longitudinal channel; and
    a second fan assembly mounted on the rail assembly and configured to force air out of the housing,
    wherein the funnel assembly defines a first opening and a second opening, the first opening being proximal to the first fan assembly and the second opening being distal to the first fan assembly.

* * * * *